(12) United States Patent
Berg et al.

(10) Patent No.: US 6,836,859 B2
(45) Date of Patent: Dec. 28, 2004

(54) METHOD AND SYSTEM FOR VERSION CONTROL IN A FAULT TOLERANT SYSTEM

(75) Inventors: Jerry Berg, Hayward, CA (US); Jerry Chu, Fremont, CA (US); Chin-Te Chen, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 541 days.

(21) Appl. No.: 09/931,083

(22) Filed: Aug. 15, 2001

(65) Prior Publication Data

US 2003/0037282 A1 Feb. 20, 2003

(51) Int. Cl.[7] .............................................. G06F 11/00
(52) U.S. Cl. ........................ 714/36; 713/2; 717/170
(58) Field of Search ....................... 714/11, 36, 23; 717/170; 713/2

(56) References Cited

U.S. PATENT DOCUMENTS

| | | | | |
|---|---|---|---|---|
| 5,864,698 A | * | 1/1999 | Krau et al. | 713/2 |
| 5,923,886 A | * | 7/1999 | Chen et al. | 717/170 |
| 6,381,694 B1 | * | 4/2002 | Yen | 713/2 |
| 6,412,082 B1 | * | 6/2002 | Matsuura | 714/38 |
| 6,446,203 B1 | * | 9/2002 | Aguilar et al. | 713/2 |
| 6,510,552 B1 | * | 1/2003 | Benayoune et al. | 717/170 |
| 6,560,703 B1 | * | 5/2003 | Goodman | 713/2 |
| 6,584,559 B1 | * | 6/2003 | Huh et al. | 713/2 |
| 6,594,757 B1 | * | 7/2003 | Martinez | 713/2 |
| 6,622,246 B1 | * | 9/2003 | Biondi | 713/100 |
| 6,675,258 B1 | * | 1/2004 | Bramhall et al. | 711/114 |
| 6,681,390 B2 | * | 1/2004 | Fiske | 717/173 |
| 2002/0014968 A1 | * | 2/2002 | Fitzgerald et al. | 340/573.1 |
| 2002/0147941 A1 | * | 10/2002 | Gentile | 714/36 |
| 2002/0188934 A1 | * | 12/2002 | Griffioen et al. | 717/170 |
| 2003/0033515 A1 | * | 2/2003 | Autry | 713/100 |

* cited by examiner

Primary Examiner—Robert Beausoliel
Assistant Examiner—Christopher S. McCarthy
(74) Attorney, Agent, or Firm—Kudirka & Jobse, LLP (57) ABSTRACT

A method and system for performing software versioning between multiple controllers in a fault tolerant system. The fault tolerant system includes a storage system and multiple redundant controllers that provide access to the storage system. The storage system has stored thereon a preferred version of software to be used by the controllers. This software may be updated. The controllers each contain non-volatile memory. On boot, a controller compares the software version in its non-volatile memory to the preferred version in the storage system. If they are different (e.g., the software on the storage system was updated or the controller was updated with a non-preferred software version), then the controller copies the storage system version into its non-volatile memory and then re-boots. One controller is typically left operational while the other is re-booted for redundancy. Computer controlled versioning allows (1) lockstep software updates between the controllers based on a software version that may be associated with the storage system as a whole and (2) provides a central store from which the controllers may obtain the preferred software version. A special flash update mechanism is also described with respect to an implementation that uses flash memory as the non-volatile memory.

14 Claims, 7 Drawing Sheets

METHOD AND SYSTEM FOR VERSION CONTROL IN A FAULT TOLERANT SYSTEM

BACKGROUND OF THE INVENTION

1. Field of the Invention

The present invention relates to the field of data storage systems. More specifically, embodiments of the present invention relate to methods and systems for providing automatic software versioning for controller units of a data storage system.

2. Related Art

Figure 1A:
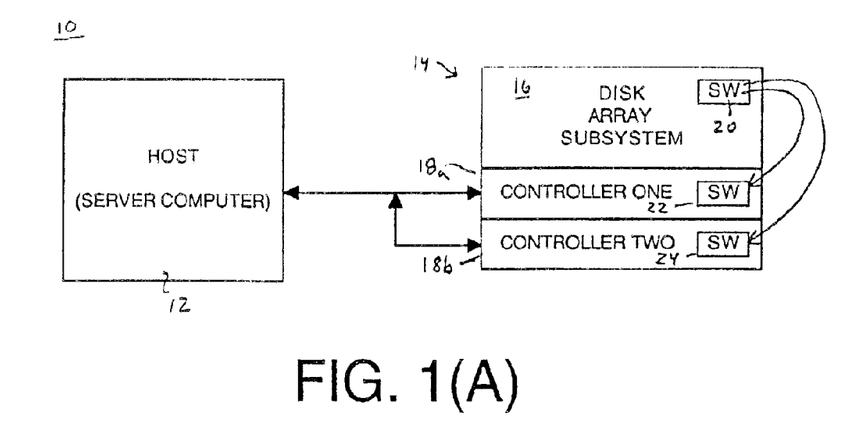
FIG. 1A and FIG. 1B are prior art disk array systems having multiple controllers, e.g., partner pairs, done so for redundancy.

FIG. 1A illustrates a system 10 that includes a host computer or server 12 that interfaces with a disk storage system 14. The disk storage system 14 is capable of storing large amounts of data, e.g., multiple terabytes, and is designed to operate with a high degree of reliability. One such storage system is the "StarEdge T3 Array" which is commercially available from Sun Microsystems, Inc., of Mountain View, Calif. To maintain the high degree of reliability and large storage capacity, fault tolerant storage system 16 is employed along with multiple redundant controller units 18a and 18b (which are also called "a partner pair"). The fault tolerant storage system may be a disk array subsystem. The disk array subsystem 16, contains an array of individual disk units arranged to provide redundancy. The controllers 18a–b operate in a master-slave fashion. The controller units 18a–b interface with the host system 12 and, in so doing, the controller units 18a–b allow the disk array subsystem 16 to be viewed by the host system 10 as one large single volume.

In the past, the software application 20 used by the controllers 18a–b was loaded into the disk array subsystem 16 and, upon booting, the controllers 18a–b would automatically download this software application into their respective volatile memories 22 and 24, e.g., random access memory (RAM). The application could then function to make the disk array subsystem 16 appear to the host system 10 as one single volume. Unfortunately, the process of downloading the application from the disk array subsystem 16 on each boot-up is very time consuming and therefore inefficient and error-prone.

Figure 1B:
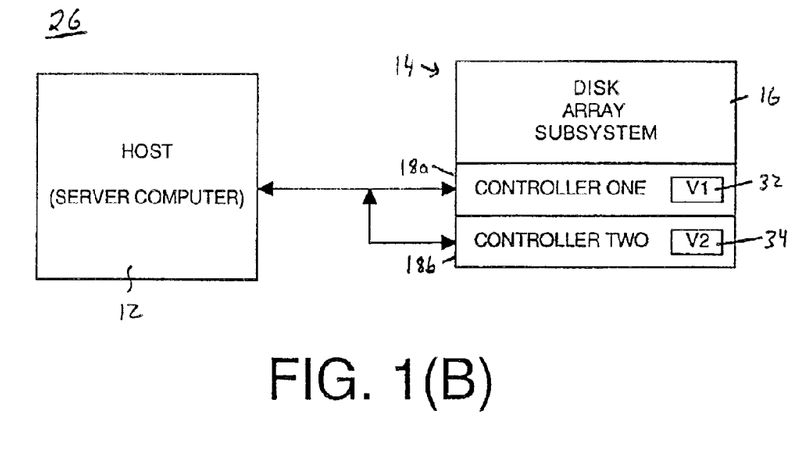

FIG. 1B illustrates another system 26 having a similar complement of components as system 10, except the controllers 18a–18b are different. In this system, the controllers 18a–18b contain a respective non-volatile memory 32 and 34 which contains the software application described above. The benefit of this design 26 is that the application no longer needs to be loaded from the disk array subsystem 16 upon each boot. Rather, the application is directly accessed by each controller from its own internal non-volatile memory, e.g., 32 and 34. The use of non-volatile memory to serve this purpose increases the overall efficiency of the controllers 18a–b.

A drawback of system 26 is that the version of the software used to control the controllers 18a–b is no longer associated with the disk system 14, but rather it becomes associated with each individual controller separately. This may lead to several potentially dangerous conditions. For example, a partner pair could have mutually exclusive software versions operating on the two controllers. This could lead to data integrity problems. This situation could occur if one controller was replaced (due to malfunction) and the replacement controller (in the typical case) contains a different software version from the remaining controller. Another example occurs when a controller is loaded into a system, which is configured to operate in an up-level software version, resulting in a conflict of software versions residing within the partner pair. Such version confusion can lead to data corruption or complete storage system failure.

SUMMARY OF THE INVENTION

Described herein are a method and system for performing computer controlled software versioning between multiple controllers in a storage system. The storage system includes a fault tolerant storage system and multiple redundant controllers that allow the disk array to be viewed as a large disk system by a host computer or server. The fault tolerant storage system has stored thereon a preferred version of software to be used by the controllers. This software may be updated by replacing the copy stored in the fault tolerant storage system. The controllers each contain non-volatile memory. On boot, a controller compares the software version in its non-volatile memory to the preferred version in the fault tolerant storage system. If they are different (e.g., the software on the fault tolerant storage system was updated or the controller was updated with a non-preferred software version), then the controller copies the disk array version into its non-volatile memory and then re-boots. One controller is typically left operational while the other is re-booted for redundancy. Computer controlled versioning allows: (1) lockstep software updates between the controllers based on a software version that is associated with (or tied to) the disk system as a whole; and (2) provides a central store from which the controllers may obtain the preferred software version.

A special flash update mechanism is also described with respect to an implementation that uses flash memory as the non-volatile memory. According to this method, each controller has two flash memories for level 2 and level 3 of its boot sequence. On boot, when level 1 of the boot sequence is booting, level 1 software is used to select the most recent valid version of the software stored on the two flash memories of level 2. That selected version is then used to boot level 2. Likewise, on boot, when level 2 is booting, level 2 software selects the most recent valid version of the software stored on the two flash memories of level 3. That selected version is then used to boot level 3. If no valid versions are available, then an error condition exists.

More specifically, embodiments of the present invention are directed toward a method of providing version control within a fault tolerant system having the follow steps: a) invoking a boot sequence of a first controller that is coupled to a storage system having stored thereon a preferred application version; b) during the boot sequence, comparing the preferred application version with a stored application version stored within a memory of the first controller; c) provided the stored application version is different from the preferred application version, storing the preferred application version into the memory and causing the first controller to re-boot to thereby execute the preferred application version after re-boot; and d) provided the stored application version is the same as the preferred application version, causing the first controller to execute the stored application version. Embodiments also include the above and wherein the memory is a programmable non-volatile memory and wherein the memory is a flash memory and wherein the storage system is disk array system.

Embodiments also include the above and wherein step a) includes the following steps: a1) executing a first level wake-up boot sequence; a2) during the first level boot sequence, checking two application versions that are associated with a second level boot sequence and selecting a most recent valid version; and a3) executing the most recent valid version as the second level boot sequence. Embodiments also include a fault tolerant storage system implemented in accordance with the above.

BRIEF DESCRIPTION OF THE DRAWINGS

FIG. 4A and FIG. 4C represent another embodiment of the computer controlled versioning process of the present invention.

DETAILED DESCRIPTION OF THE INVENTION

In the following detailed description of the embodiments of the present invention, a method and system for computer controlled versioning between controller partner pairs in a disk storage system, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions (e.g., processes 200, 400) of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those utilizing physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "comparing," "accessing," "processing," "computing," "suspending," "resuming," "translating," "calculating," "determining," "scrolling," "displaying," "recognizing," "executing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Disk Storage System

Figure 2:
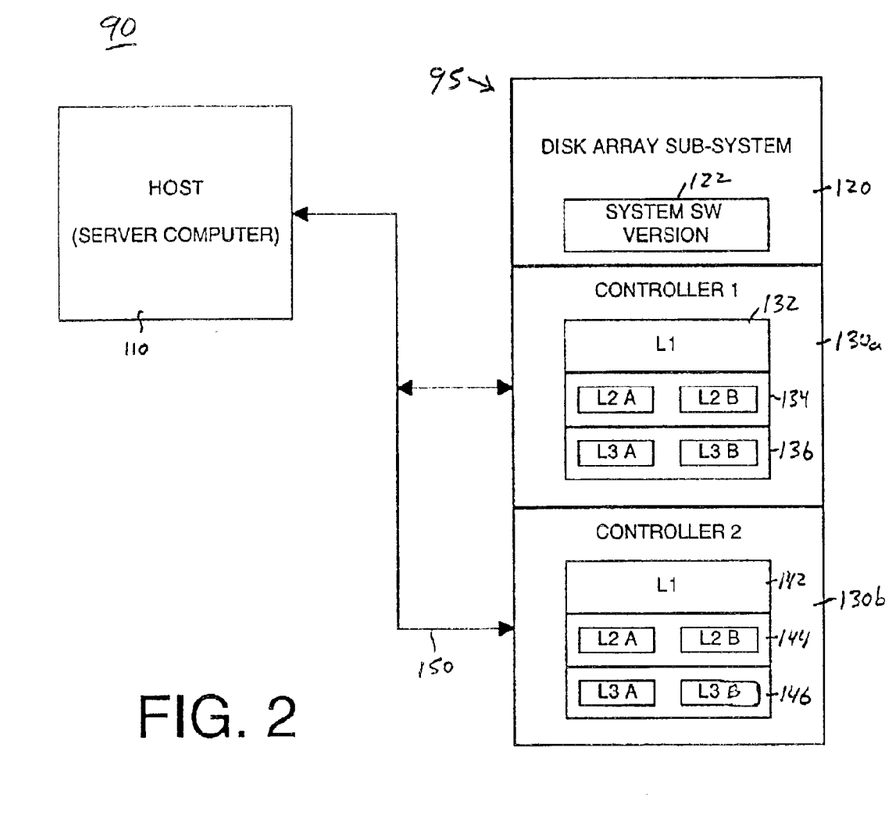
FIG. 2 illustrates a diagram of a disk array system in accordance with one embodiment of the present invention.

FIG. 2 illustrates an exemplary system 90 in accordance with an embodiment of the present invention. System 90 includes a host computer system or server system 110 which communicates over bi-directional digital interface connection 150 (such as, for example, Fibre Channel (FC), SCSI, or TCP/IP) to a disk storage system 95. Disk storage system 95 is characterized has providing high storage capacity with high reliability. In one implementation, multiple terabytes of storage can be provided. Disk storage system 95 includes a fault tolerant storage system 120. The fault tolerant storage system could be of any technology, but in one implementation is a disk array subsystem 120 that contains a disk medium, e.g., an array of disk drives arranged in a redundant fashion as is well known in the art. Fault tolerant storage system 120 may be implemented in accordance with well known RAID technology, e.g., Redundant Array of Independent Disks.

The fault tolerant storage system 120 contains a preferred application version 122 that can be user loaded. Typically, the preferred application version 122 is stored in some type of disk medium but could be stored in the fault tolerant storage system 120 using any computer readable medium or memory. Alternatively, the preferred application version 122 could be stored in any location in any medium as long as the application version 122 was in some way accessible to the controllers. For instance, the application version 122 could be stored in one of the controllers, or, it could be remotely stored and accessible over a wireless communication link, the Internet, etc.

The software 122 is stored in a central storage location to which both controllers have access. The user, via the host system 110 for example, may upgrade, change, replace, etc., the preferred system software 122 as needed. It is appreciated that from the point of view of the administrator or user, the preferred system software 122 is associated with or tied to the disk storage system 95. Software 122 may contain boot sequence instructions, device drivers, an operating system and application software for managing the redundant fault tolerant storage system 120.

As mentioned above, storage system 95 also includes multiple redundant controller units 130*a* and 130*b* (two are shown for example) which are both coupled to the fault tolerant storage system 120 and interface with host system 110. The controller "partner pair" 130*a*–*b* are responsible for interfacing the fault tolerant storage system 120 to the host system 110. In other words, the controllers 130*a*–*b* allow the fault tolerant storage system 120 to appear to the host system 110 as one very large single disk system. The preferred system software 122 may be obtained by and is used by the controllers 130*a*–*b* to perform this function. The controllers 130*a*–*b* can operate in a master-slave relationship and multiple controllers may be provided for redundancy to increase system reliability. The controllers may be swapped in and out of the system, individually, while the system 95 remains fully operational. The controllers may be individually swapped, booted, etc., while the system is active without interfering with system availability.

In one embodiment, controller 1 (130*a*) of FIG. 2 contains three levels of programmable non-volatile memory, e.g., "firmware," for storing initialization, diagnostic and test code, drivers, an operating system, and an application that all constitute the boot sequence of the controller. There are three major levels of boot sequences in one exemplary implementation. The first level, level 1, is used upon reset or power-on of the controller 130*a*. Level 1 performs basic wake-up functions, and other functions further described below. Level 2 is next executed and controls hardware resource discovery, and base level diagnostics. Level 2 also performs "POST" (power-on self test) functionality and base integrity testing. Level 3 is then executed and loads device drivers (to access the fault tolerant storage system 120) and performs high level diagnostics. Level 3 also invokes the operating system and the application that is used by the controller 130*a* to perform its primary functions. Controller 2 (130*b*) is generally a duplicate of controller 130*a* and contains analogous firmware levels. One controller is the master and the other controller is the alternate master.

In controller 130*a*, the level 1 application firmware is stored in non-volatile memory 132. Programmable non-volatile memory 134 contains the level 2 firmware. In one implementation, there are two separate copies ("images") of the firmware for level 2, image L2A and image L2B. The images may be different and each image can record the date it was programmed into the memory. The memories can be implemented as two separate memory spaces of the same memory circuit, or, two separate memory circuits can be used. The dual memories provide redundancy in case one image is corrupted, in which case the other image can be used to boot the controller.

Programmable non-volatile memory 136 contains the level 3 firmware. In one implementation, there are two separate copies ("images") of the firmware for level 3, image L3A and image L3B. Like level 2, the level 3 images can be different and each image records the date it was programmed into the memory. The memories can be implemented as two separate memory spaces of the same memory circuit, or, two separate memory circuits can be used. As discussed above, the dual memories provide redundancy for the case where one image is corrupted, and the other image can then be used to boot the controller. In one exemplary implementation, the non-volatile memory 134 and 136 is/are flash memory, but any memory type could be used, e.g., EPROM, EEPROM, etc.

Controller 2 (130*b*) can be generally a duplicate of controller 130*a* and contains analogous memories, 142 for level 1, memory 144 for level 2 and memory 146 for level 3. Level 2 firmware is stored in two memories, L2A and L2B and level 3 firmware is stored in two memories, L3A and L3B. It is appreciated that while FIG. 2 illustrates a system 90 containing two controller units, the present invention may equally well be applied to systems that have fewer or more controllers.

As described below, embodiments of the present invention are directed to computer controlled processes or procedures for performing computer controlled versioning between the controllers and controller partner pairs. These procedures can be executed by embedded computer systems within the controllers, for example.

Figure 3:
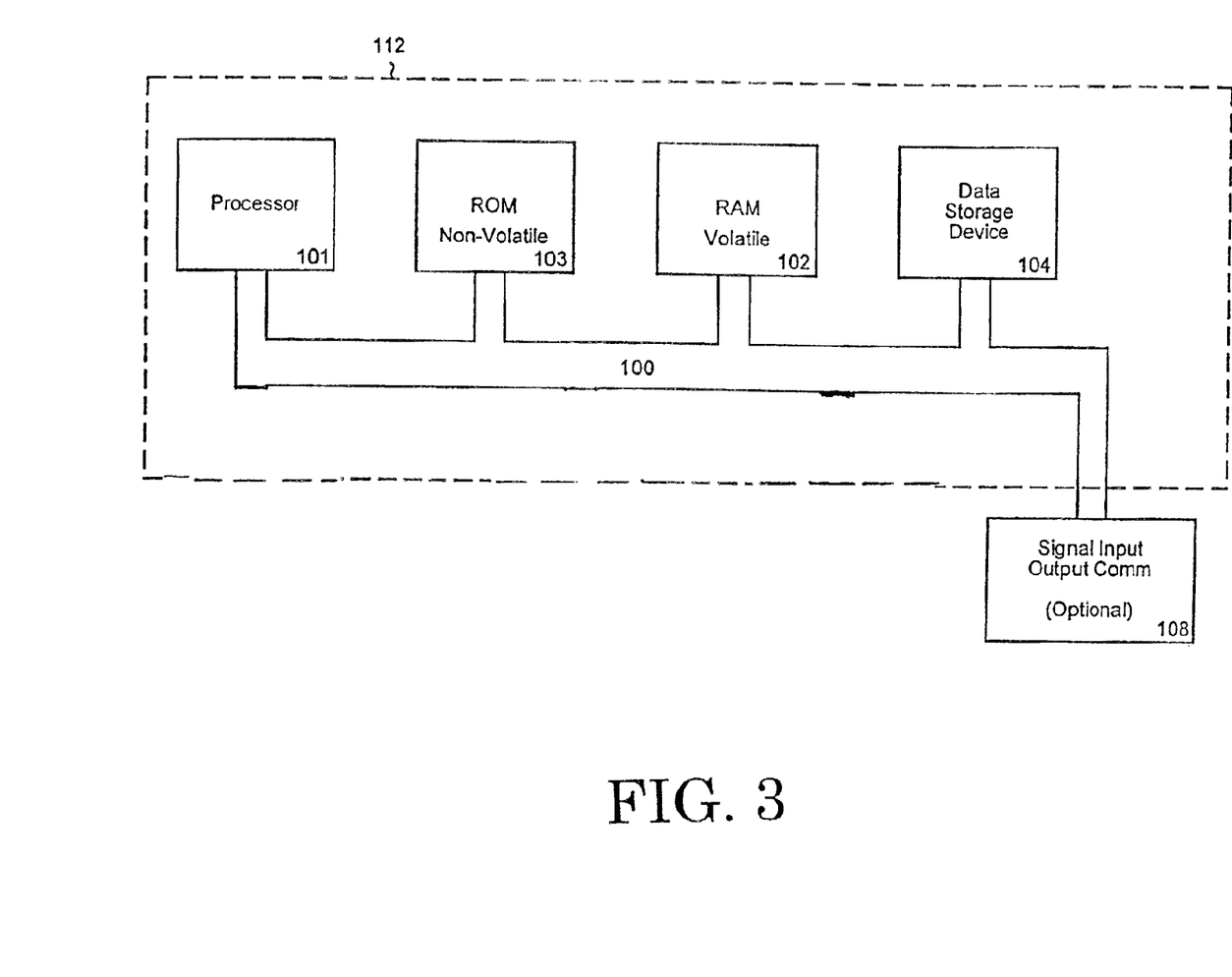
FIG. 3 is an embedded computer system that can be used as a platform on which to implement aspects of the computer controlled versioning processes of the present invention.

FIG. 3 illustrates a general purpose embedded computer system that can be used as a platform for the following flow diagrams. Embedded computer system 112 may be found in either controller 130*a* or controller 130*b*, or both. Embedded computer system 112 includes an address/data bus 100 for communicating information, a central processor 101 coupled with the bus 100 for processing information and instructions, a volatile memory 102 (e.g., random access memory RAM) coupled with the bus 100 for storing information and instructions for the central processor 101 and a non-volatile memory 103 (e.g., read only memory ROM, also called 132–136 and/or 142–146) coupled with the bus 100 for storing static information and instructions for the processor 101. Memory 103 may be flash memory. Computer system 112 also includes an optional data storage device 104 (e.g., thin profile removable memory or fault tolerant storage system 120) coupled with the bus 100 for storing information and instructions. Signal communication device 108, also coupled to bus 100, can be any type of digital communication interface, e.g., a serial port or parallel port.

Figure 4A:
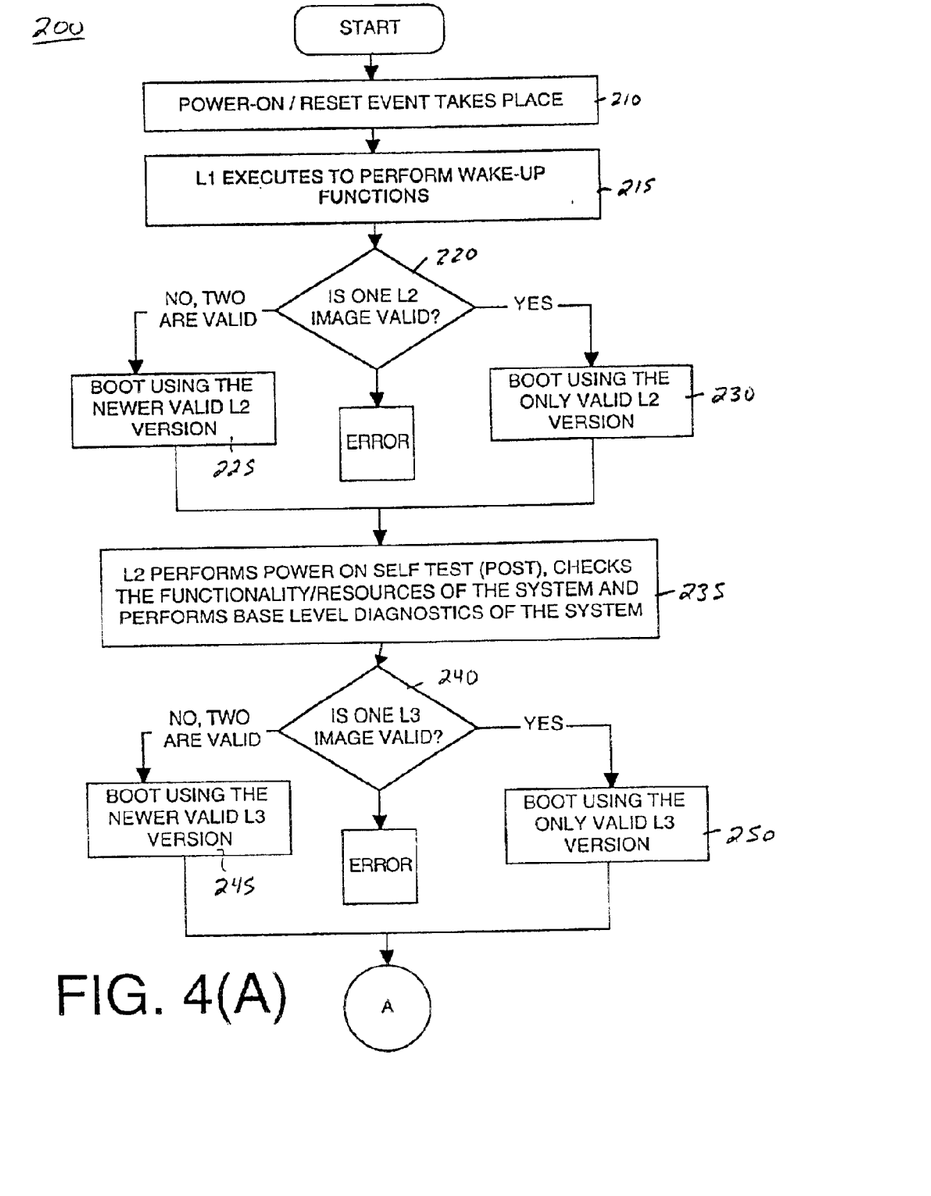
FIG. 4A and FIG. 4B represent one embodiment of the computer controlled versioning process of the present invention.
Figure 4B:
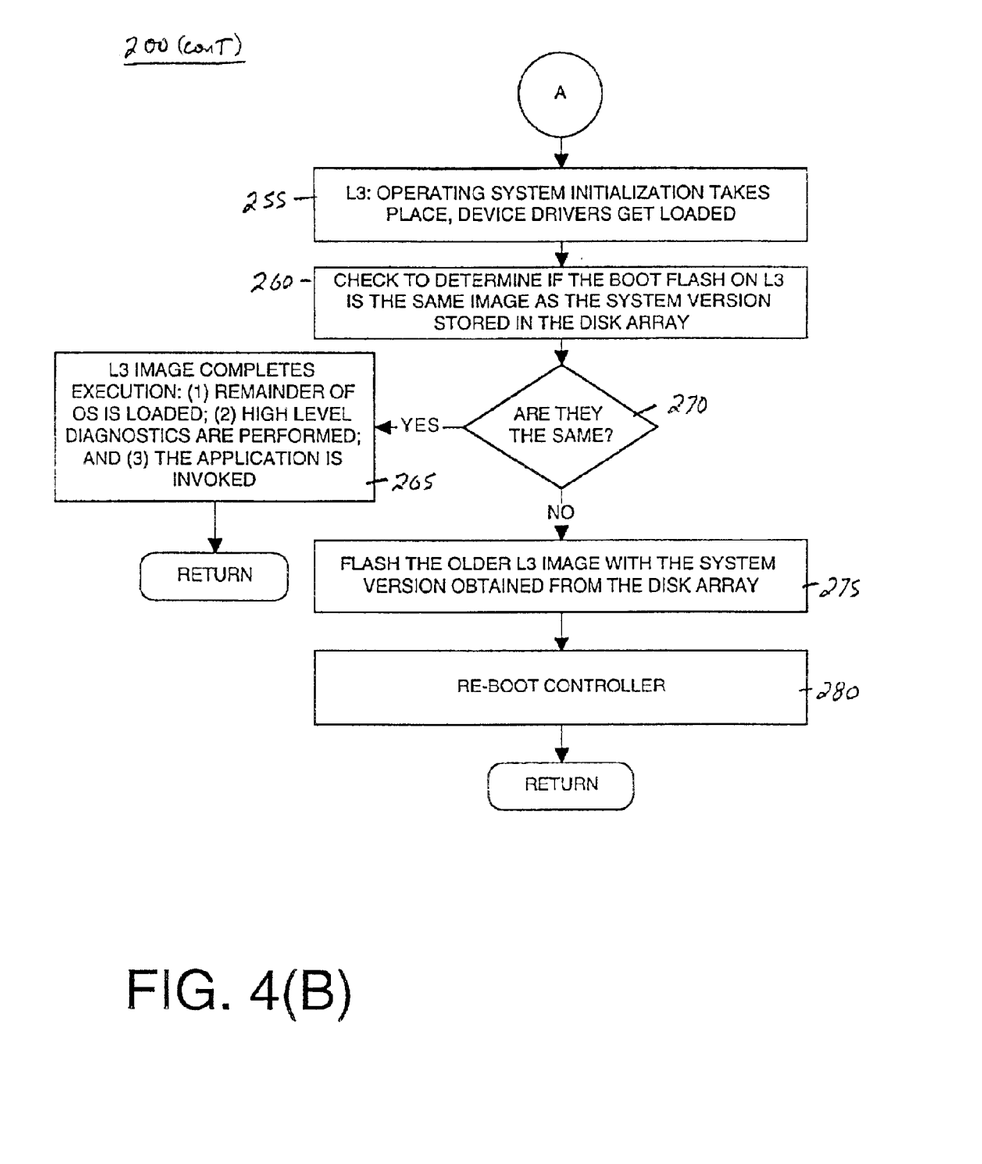

FIGS. 4A and FIG. 4B illustrate a computer controlled versioning process 200 in accordance with one embodiment of the present invention whereby the firmware of the controllers 130*a* and 130*b* are automatically lock-step updated, if necessary, to conform with the version 122 stored within the fault tolerant storage system 120 (FIG. 2).

Process 200 commences at step 210 where a reset event takes place, e.g., a power-on or reset condition, with respect to one of the controllers (e.g., the "booting controller"). In general, the other controller remains operational while the booting controller goes through process 200. At step 215, the level 1 firmware executes and performs wake-up procedures and functions. As part of the level 1 firmware, the booting controller checks the two images stored in the firmware for level 2, e.g., L2A and L2B. As between these, if both images represent valid versions of the firmware, then step 225 is entered. If only one version is valid, then step 230 is entered, otherwise an error occurs.

At step 225, the level 1 firmware selects the most recently stored valid version of the level 2 firmware. This version is allowed to boot as the level 2 boot sequence. Step 235 is then entered. Alternatively, at step 230, the level 1 firmware selects the only valid version of the level 2 firmware. This version is allowed to boot as the level 2 boot sequence. Step 235 is then entered At step 235, the level 2 firmware is executing and it performs POST functionality as well as hardware discovery and low level diagnostics. During the boot sequences, the level 2 firmware selects the proper level 3 firmware in a similar fashion as performed by level 1. For instance, the controller, at step 240, checks the two images stored in the firmware for level 3, e.g., L3A and L3B. As between these, if both images represent valid versions of the firmware, then step 250 is entered, otherwise an error occurs.

At step 245, level 2 selects the most recently stored valid version of the level 3 firmware. This version is allowed to boot as the level 3 boot sequence. Step 255 (FIG. 4B) is then entered. Alternatively, at step 250, level 2 selects the only valid version of the level 3 firmware. This version is allowed to boot as the level 3 boot sequence. Step 255 (FIG. 4B) is then entered.

FIG. 4B illustrates the remainder of this embodiment of process 200. At step 255, the operating system is initialized, e.g., device drivers are loaded during the level 3 boot. These device drivers are used so that the fault tolerant storage system 120 can be accessed by the booting controller. Importantly, according to the computer controlled versioning process of the present invention, at step 260, the booting controller performs a check to determine if the selected image for the level 3 firmware (e.g., the boot image or the boot flash) is the same as the preferred software version 122 as stored in the fault tolerant storage system 120. In order to perform this verification, the fault tolerant storage system 122 is accessed at step 260 to read the version information associated with software 122. The comparison of the disk image 122 to the flash image for L3 is performed at step 270.

If the versions are different, then at step 275, the older flash image (as between L3A and L3B) is then replaced with the disk image 122. This can be performed using a number of programming techniques for non-volatile memory. In one embodiment, the older image is merely re-flashed with the disk image 122. After the re-flashing process, at step 280, the booting controller is then reset (to re-boot it) and process 200 commences again.

Alternatively, if the disk image 122 and the booting flash image are the same, then step 265 is entered where the L3 boot sequence is allowed to complete using the selected flash image. For instance, the remainder of the operating system is loaded, high level diagnostics are performed and then the controller application is loaded and executed. At this stage, the booting controller is up and operational.

It is appreciated that by following process 200, the software version 122 stored on disk will be used as a replacement for any other conflicting version of the L3 firmware of the booting controller. According to embodiments of the present invention, by sequentially booting the controllers in lock-step fashion, all controllers of the disk storage system 90 will thereby receive the same software version automatically, e.g., that version 122 stored in the fault tolerant storage system 120. Alternatively, if a replacement controller is introduced into the system and comes with a conflicting software version, then on its first boot the controller will automatically re-flash its firmware with the correct software and then re-boot with normal execution. This effectively allows the software version 122 to be associated with the entire fault tolerant storage system 120, and not assigned to any particular controller. Also, by allowing the software version to be stored and booted from flash memory (within the controller), the present invention also provides controller efficiency for subsequent boot-up sequences.

Figure 4C:
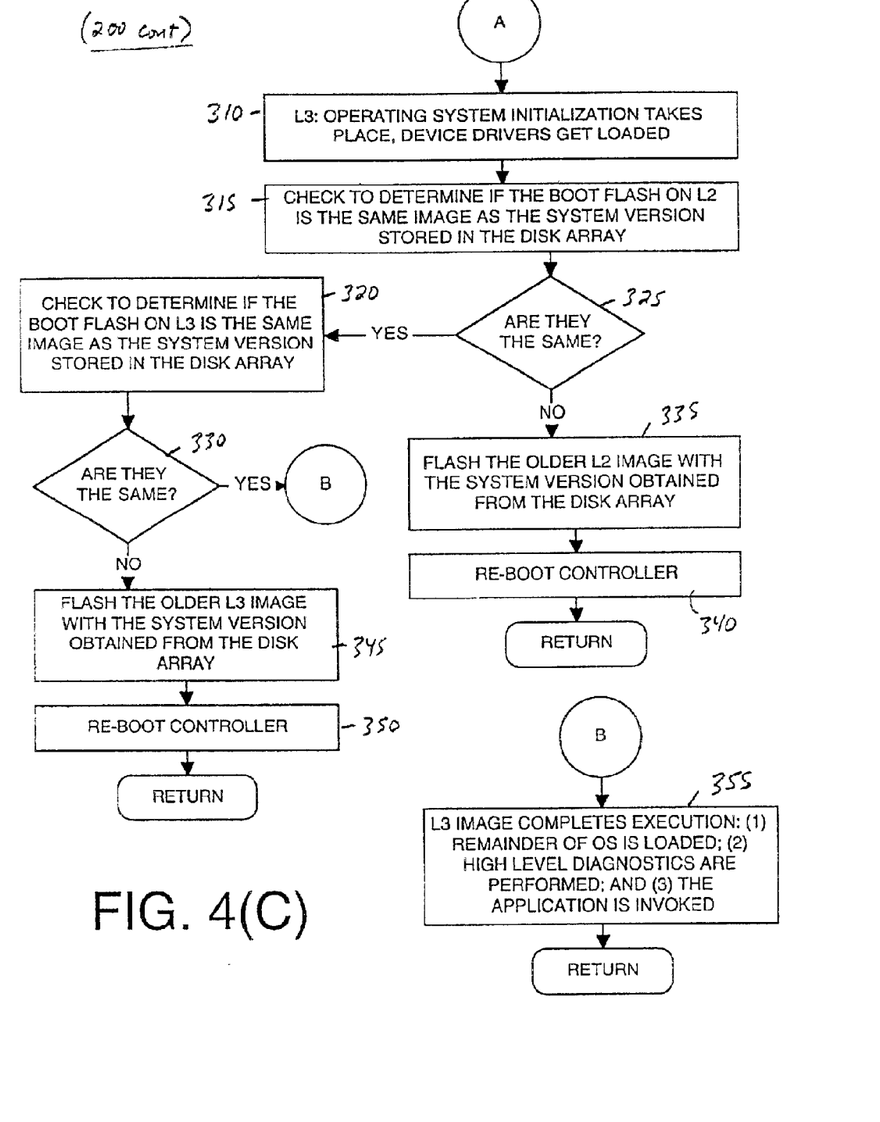

A second embodiment of the present invention is described with respect to FIG. 4A and FIG. 4C. FIG. 4C is similar to the process steps of FIG. 4B except both the L2 and the L3 image may be updated to the disk image 122. Step 310 of FIG. 4C is the same as step 255 of FIG. 4B. At step 315, the booting controller obtains the version information for the disk image 122 corresponding to the L2 firmware. A check is made at step 315 if the flash image (being booted) for L2 is the same as the disk image 122. If yes, then at step 320, the booting controller obtains the version information for the disk image 122 corresponding to the L3 firmware. A check is made at step 330 if the flash image (being booted) for L3 is the same as the disk image 122. If so, then step 355 enters which is the same as step 265 of FIG. 4B.

At step 325, if the flash image for L2 is not the same as the disk image 122, then the older flash memory (as between L2A and L2B) is re-flashed with the disk image 122. The controller is then re-booted at step 340 and process 200 starts over again.

At step 330, if the flash image for L3 is not the same as the disk image 122, then the older flash memory (as between L3A and L3B) is re-flashed with the disk image 122. The controller is then re-booted at step 350 and process 200 starts over again.

It is appreciated that by following the second process 200, the software version 122 stored on disk will be used as a replacement for any other conflicting version of the L2 firmware or the L3 firmware of the booting controller.

Figure 5:
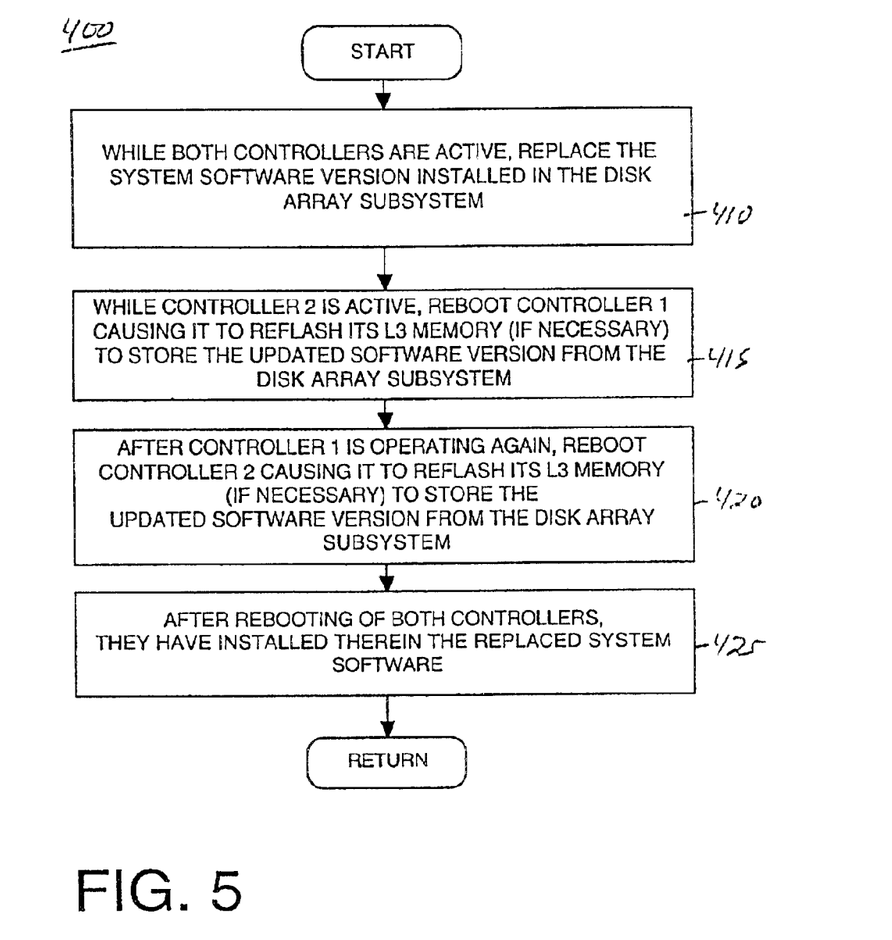
FIG. 5 is a flow diagram illustrating one process for lock-step software normalization between two controllers of a partner pair in accordance with an embodiment of the present invention.

FIG. 5 illustrates an exemplary process 400 that can be performed by a network administrator for performing computer controlled versioning between multiple redundant controllers. In process 400, it is assumed that a software upgrade of the disk storage system is required. Process 400 performs an interlocking ("lock step") update across the controllers using a central store as the source of the preferred software. At step 410, while both controllers are operational, the administrator may upgrade the software version 122 on the fault tolerant storage system 120. After the disk image 122 is updated, one of the controllers (the booting controller) is then reset at step 415. This controller will then update its firmware (using a re-flash process) to conform to the disk image automatically as described with respect to process 200. The L3 firmware or both the L3 firmware and the L2 firmware may be updated. After any re-flash process, the controller then boots again.

After the booting controller is operational again, the remaining controller is then reset is at 420. This controller will then update its firmware to conform to the disk image automatically as described with respect to process 200. The L3 or both the L3 and the L2 firmware may be updated. After any re-flash process, the controller then boots again. At step 425, both controllers are updated with the proper version of the software and they are normalized to the newly installed version 122 on disk.

In an alternative embodiment of the present invention, the preferred software version could be stored in any location that is accessible by the controllers. If this version is different from the versions stored in the controllers, then the more recent application version (regardless of its location) is used by the system to overwrite the older application version (regardless of its location) such that the storage system and the controllers have the same application version.

There are three conditions that may arise during the boot process at the version comparison time. First, there is no software image on the disk. This happens the first time the software is booted on the system. Second, the disk software image is different from that within the controller's flash ROM. This may happen when a new controller is loaded into the system, or following a software version upgrade. Third, the disk software image is the same as that within the controller's flash ROM. This is the normal case where a controller is booted in a system where the controller has previously been booted. Embodiments of the present invention address each condition.

Exemplary Operation

The following discussion explains several exemplary operational modes involving the computer controlled versioning process of the present invention in response to several typical use scenarios.

Normal Single-Controller System Booting: This is the simplest case whereby a single system controller is involved. The normal case involves the software version (within the flash ROM) being the same as that found on the disk boot area. During the boot sequence, no special operation(s) are involved and the system boots normally.

Single-Controller System Software Upgrade: Again, this is the simplest case of a software upgrade since a single system controller is involved. The operator executes the normal software upgrade procedure (using boot and reset commands) to upgrade the system disk boot software image. Upon resetting of the system, the boot process will determine that the software image in the flash ROM is a different version from that found on the system disk. The boot process will then cause the flash ROM to re-flash (using the disk software image). Following the re-flash process, the system will then re-boot following the normal single-controller system booting process will occur. As a result, there will be two boots performed.

Single-Controller System Controller Replacement with Same Software Version: Following the replacement of the controller, this scenario will result in a normal single-controller system booting process.

Single-Controller System Controller Replacement with Different Software Version: In this case, the controller has a different software version than that which is on the system disk. The process is almost identical to the single-controller system software upgrade. During the boot process, the differing software version will be detected. At this time, the boot process will cause the flash ROM to re-flash (using the disk software image). Following the re-boot, a normal single-controller system booting process will occur. As a result, there will be two boots performed.

Single-Controller to System Upgrade: When upgrading from a non-system controller to a system controller, there will normally be no system disk image on the system disk. During the boot process, this lack is discovered. The boot process will then write a disk image to the system disk, using the controller flash ROM contents as the source of the software. Following this, the boot process will continue the normal boot sequence causing the system application to come on-line.

In the event that a system disk image is already on the system disk, a normal boot process version check is performed. The results of this version check will result in either a normal single-controller system booting sequence, or a single-controller controller replacement (different software version). As a result, there will be two boots performed.

Factory Initialization of A New System—Single-Controller: When a system single-controller is initially built and turned on for the first time, there is no system disk image on the system disk. Consequently, the same scenario is created as in the first paragraph of the single-controller non-system to system upgrade. During the boot process, a disk image will be created and a single boot will be performed.

Single-Controller System "Live" Software Upgrade: To upgrade the software of a single-controller, the system is re-booted which results in loss of host connectivity. The single-controller system software upgrade process is performed.

Normal Partner-Pair System Booting: In this case, the software version found in the flash ROM of both system controllers is identical to that on the system disk. As a result, both controllers will boot without any software version difference impacts.

Partner-Pair System Software Upgrade: This scenario is not to be confused with the partner-pair system live software upgrade. In this case, the software upgrade is performed in the same way as the single-controller system software upgrade. First a boot command is done to upgrade the disk image, then a reset command is done to cause the re-booting of both controllers. During the re-boot process, both controllers will auto-upgrade their flash ROM. Note that both controllers will double boot so both controllers can re-flash their flash ROMs.

Partner-Pair System Controller Replacement—Same Software Version: In this case, the software version in both controller flash ROMs is identical to the software version on the system disk. As a consequence, normal partner-pair booting will occur while replacing the controllers. Each controller is replaced individually and a normal boot process is performed for each controller. Host connectivity should continue without disruption.

Partner-Pair System Controller Replacement—Different Software Version: Due to the software version being different in the controller flash ROM as compared to system disk, the same sequence will occur as during the single-controller controller replacement (different software version). The original controller is replaced with the new controller and the boot sequence begins. When the different software version is detected, the flash ROM is re-flashed with the contents of the system disk image. The controller is then re-booted, which causes it to load and execute the correct software version. Consequently, there are two boots of controller required.

Partner-Pair Non-System to System Upgrade: It is assumed there is no system software image on the system disk. The process involves several steps to this procedure. Initially a capable controller replaces the alternate master. While it is booting, it is observed that there is no software image on the system disk. This will result in the system controller writing a software image to the system disk. Following this, the controller continues with the booting process. Consequently, the system disk area is set to the same version as the controller flash ROM software version.

Following the successful booting of the system controller, the master is disabled to cause a fail-over to the system. Once the system controller is the master, the old controller is replaced with the second system controller. While booting, the software version is compared and the flash ROM is re-flashed if required.

Following the second system controller coming on-line, the operator checks the system software version for being the correct version. If it is desired to change the software version, the operator has the choice being the partner-pair system software upgrade, or the partner-pair system live software upgrade.

Factory Initialization of A New System—Partner Pair: This procedure is a combination of two separate procedures. During the initial booting of the system controller, it follows the Factory Initialization of A New System—Single-Controller. Once the system disk image is installed, the second system follows the normal single-controller system booting procedure.

Partner-Pair System "Live" Software Upgrade: This process involves usage of the disable and enable commands of both controllers to force a re-booting of each controller individually. Initially, the operator executes a normal boot command to install a new system disk software version. Then each controller is individually disabled and enabled. The result will be that each controller executes the equivalent of a single-controller controller replacement (different software version) without the physical replacement of the controllers The software version difference results in a re-flash of the controller flash ROM, followed by a re-boot. Consequently each controller executes two boots during the process.

Therefore, embodiments of the present invention may reduce or eliminate the version conflicts that can arise between partner pair controllers within a disk storage system while maintaining the efficiencies associated with storing application software in the controller's non-volatile memory. Embodiments may also provide a central location of a non-volatile storage system from which controllers can perform lockstep software upgrades so that a same software version is loaded into each controller. Embodiments may provide a disk storage system that offers a mechanism by which a software version can be tied to the storage system and not merely tied to individual controllers.

The preferred embodiment of the present invention, a method and system for computer controlled versioning between controller partner pairs in a disk storage system, is thus described. While the present invention has been described in particular embodiments, it should be appreciated that the present invention should not be construed as limited by such embodiments, but rather construed according to the below claims.

What is claimed is:

1. A method of providing version control within a fault tolerant system comprising:
   a. invoking a boot sequence of a first controller that is coupled to a non-volatile storage system by:
   a1. executing a first level wake-up boot sequence;
   a2. during said first level boot sequence, checking two application versions that are associated with a second level boot sequence and selecting a most recent valid version;
   a3. executing said most recent valid version as said second level boot sequence;
   a4. during said second level boot sequence, checking two application versions that are associated with a third level boot sequence and selecting a most recent valid version; and
   a5. executing said most recent valid version as said third level boot sequences;
   b. during said boot sequence, comparing a preferred application version with a stored application version stored within a memory of said first controller;
   c. provided said stored application version is different from said preferred application version, storing with said preferred application version into said memory; and
   d. provided said stored application version is the same as said preferred application version, causing said first controller to execute said stored application version.

2. A method as described in claim 1 wherein said preferred application version is stored in said non-volatile storage system and wherein c) comprises causing said first controller to re-boot.

3. A method as described in claim 1 wherein said memory is a programmable non-volatile memory.

4. A method as described in claim 1 wherein said memory is a flash memory.

5. A method as described in claim 1 wherein said non-volatile storage system is a disk array storage system.

6. A method as described in claim 1 wherein said preferred application version provides an interface between a host server and said non-volatile storage system.

7. A method as described in claim 1 wherein said second level boot sequence performs hardware discovery and base level diagnostics.

8. A method as described in claim 1 wherein said fault tolerant system further comprises a second controller coupled to said non-volatile storage system and wherein said method further comprises:
   invoking a boot sequence of said second controller while said first controller is operational;
   during said boot sequence of said second controller, comparing said preferred application version with a stored application version that is stored within a memory of said second controller;
   provided said stored application version of said second controller is different from said preferred application version, storing said preferred application version into said memory of said second controller and causing said second controller to re-boot; and
   provided said stored application version of said second controller is the same as said preferred application version, causing said second controller to execute said stored application version.

9. A method of providing version control within a fault tolerant system comprising a non-volatile storage system coupled to first and second controllers, said method comprising the steps of:
   a. while said second controller is operational, invoking a boot sequence of said first controller wherein said non-volatile storage system contains a preferred application version that is associated with said non-volatile storage system by
   a1. executing a first level wake-up boot sequence;
   a2. during said first level boot sequence, checking two application versions that are associated with a second level boot sequence and selecting a most recent valid version;
   a3. executing said most recent valid version as said second level boot sequence;
   a4. during said second level boot sequence, checking two application versions that are associated with a third level boot sequence and selecting a most recent valid version; and
   a5. executing said most recent valid version as said third level boot sequences;
   b. during said boot sequence, comparing said preferred application version with a stored application version stored within a memory of said first controller;
   c. provided said stored application version is different from said preferred application version, storing said preferred application version into said memory; and
   d. provided said stored application version is the same as said preferred application version, causing said first controller to execute said stored application version.

10. A method as described in claim 9 wherein c) comprises causing said first controller to re-boot.

11. A method as described in claim 9 wherein said memory is a flash memory.

12. A method as described in claim 9 wherein said preferred application version provides an interface between a host server and said non-volatile storage system.

13. A method as described in claim 9 wherein said second level boot sequence performs hardware discovery and base level diagnostics.

14. A method as described in claim 9 wherein said method further comprises the steps of:
   invoking a boot sequence of said second controller while said first controller is operational;

during said boot sequence of said second controller, comparing said preferred application version with a stored application version stored within a memory of said second controller;

provided said stored application version of said second controller is different from said preferred application version, storing said preferred application version into said memory of said second controller and causing said second controller to re-boot; and provided said stored application version of said second controller is the same as said preferred application version, causing said second controller to execute said stored application version.

* * * * *